US012654933B2

(12) United States Patent
Zhou

(10) Patent No.: US 12,654,933 B2
(45) Date of Patent: Jun. 16, 2026

(54) SPLICED TRASH CAN

(71) Applicant: Fangyi Zhou, Zhejiang (CN)

(72) Inventor: Fangyi Zhou, Zhejiang (CN)

( * ) Notice: Subject to any disclaimer, the term of this patent is extended or adjusted under 35 U.S.C. 154(b) by 0 days.

(21) Appl. No.: 18/747,347

(22) Filed: Jun. 18, 2024

(65) Prior Publication Data

US 2025/0382126 A1 Dec. 18, 2025

(51) Int. Cl.
*B65F 1/14* (2006.01)
*B65F 1/16* (2006.01)

(52) U.S. Cl.
CPC .......... *B65F 1/1426* (2013.01); *B65F 1/1468* (2013.01); *B65F 1/1638* (2013.01); *B65F 2001/1653* (2013.01)

(58) Field of Classification Search
CPC .... B65F 1/1426; B65F 1/1468; B65F 1/1638; B65F 2001/1653; B65D 11/1873
See application file for complete search history.

(56) References Cited

U.S. PATENT DOCUMENTS 4,782,972 A * 11/1988 Wenkman ................. B42F 7/10 312/263
6,241,115 B1 * 6/2001 Delmerico ............ B65F 1/1426 220/495.08
6,415,495 B1 * 7/2002 Delmerico ............ B65F 1/1426 264/328.8
7,185,783 B1 * 3/2007 Miller ................... B65F 1/1468 220/675
10,683,165 B2 * 6/2020 Yang ......................... B65F 1/06
2007/0145051 A1 * 6/2007 Uffner ................ B65D 11/1873 220/4.28
2008/0164257 A1 * 7/2008 Boll ...................... B65F 1/1623 220/264
2009/0194532 A1 * 8/2009 Yang ..................... B65F 1/1638 220/211
2013/0098913 A1 * 4/2013 Yang ......................... B65F 1/08 220/263
2015/0075393 A1 * 3/2015 Ho ........................ B65F 1/1405 100/245
2018/0257859 A1 * 9/2018 Shek ..................... B65F 1/1646
(Continued)

FOREIGN PATENT DOCUMENTS

CN 203845279 U * 9/2014
CN 203845284 U * 9/2014
(Continued)

*Primary Examiner* — William L Miller
(74) *Attorney, Agent, or Firm* — Hawaii Patent Services; Nathaniel K. Fedde; Kenton N. Fedde

(57) ABSTRACT

A spliced trash can comprises a bucket wall with an upper end and a lower end, wherein the bucket wall comprises a plurality of wall plates, clamping components are arranged on the wall plates, and the plurality of wall plates are connected in sequence through the clamping components to form the bucket wall; an upper cover attached to the upper end of the bucket wall; a lower seat attached to the lower end of the bucket wall; a plurality of reinforcing plates attached to the wall plates; wherein, the wall plate comprises a clamping end and a receiving end, and the clamping component comprises at least one clamping part arranged at the clamping end and at least one receiving bayonet arranged at the receiving end, and the receiving bayonet corresponds to the clamping part.

18 Claims, 9 Drawing Sheets

(56) References Cited

U.S. PATENT DOCUMENTS

| | | | | |
|---|---|---|---|---|
| 2019/0276232 | A1* | 9/2019 | Yang | B65F 1/163 |
| 2020/0115158 | A1* | 4/2020 | Wang | B65F 1/06 |
| 2022/0212864 | A1* | 7/2022 | Wegner | B65F 1/08 |
| 2024/0076123 | A1* | 3/2024 | Bing | B65F 1/1452 |
| 2024/0150116 | A1* | 5/2024 | Han | B65F 1/02 |
| 2024/0375818 | A1* | 11/2024 | Yu | B65D 11/16 |
| 2024/0400298 | A1* | 12/2024 | Lewchuk | A47L 9/1472 |
| 2025/0033873 | A1* | 1/2025 | Buck | B65F 1/06 |

FOREIGN PATENT DOCUMENTS

| | | | | | |
|---|---|---|---|---|---|
| CN | 203845285 | U | * | 9/2014 | |
| CN | 215754446 | U | * | 2/2022 | |
| CN | 217262305 | U | * | 8/2022 | |
| CN | 218618380 | U | * | 3/2023 | |
| CN | 218752729 | U | * | 3/2023 | B65F 1/1426 |
| CN | 219340555 | U | * | 7/2023 | |
| CN | 221069515 | U | * | 6/2024 | |

* cited by examiner

SPLICED TRASH CAN

TECHNICAL FIELD

The present invention relates to the technical field of daily necessities, in particular to a spliced trash can.

BACKGROUND

Most of the common trash cans in the market are integrally formed or split structures, which have low structural strength. Due to the easy deformation of parts in the process of moving and transporting, the cooperation between parts is affected, which will affect the rapid assembly of trash cans and even lead to the inability to assemble trash cans.

For example, a trash can disclosed in the US20220212864 has the problem that parts are easily deformed during moving and transportation, leading to the result that the trash cannot be assembled; similarly, a trash can disclosed in the U.S. patent publication No. 20190276232 also has the above problems.

Based on this, it is necessary to put forward a new type of trash can, which is convenient to transport, not easy to deform, and convenient to assemble, and provides users with a more convenient and worry-free trash can experience.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a spliced trash can, which includes:

a bucket wall with an upper end and a lower end, wherein the bucket wall comprises a plurality of wall plates; clamping components are arranged on the wall plates, and the plurality of wall plates are sequentially connected through the clamping components to form the bucket wall;

an upper cover attached to the upper end of the bucket wall; and a lower seat attached to the lower end of the bucket wall; and wherein, the wall plate comprises a clamping end and a receiving end, the clamping end is arranged in a direction extending between the upper end and the lower end, and the receiving end corresponds to the clamping end; the clamping component comprises at least one clamping part arranged at the clamping end and at least one receiving bayonet arranged at the receiving end, the receiving bayonet corresponds to the clamping part, and the wall plates are detachably connected through the clamping part and the receiving bayonet.

The present invention provides a spliced trash can, which includes a bucket wall with an upper end and a lower end, comprising a plurality of wall plates, wherein clamping components are arranged on the wall plates, and the plurality of wall plates are sequentially connected through the clamping components to form the bucket wall; an upper cover attached to the upper end of the bucket wall;

a lower seat attached to the lower end of the bucket wall;

a plurality of reinforcing plates attached to the wall plate; and wherein, the wall plate comprises a clamping end and a receiving end, the clamping end is arranged in a direction extending between the upper end and the lower end, and the receiving end corresponds to the clamping end; the clamping component comprises at least one clamping part arranged at the clamping end and at least one receiving bayonet arranged at the receiving end, the receiving bayonet corresponds to the clamping part, and the wall plates are detachably connected through the clamping part and the receiving bayonet.

The present invention further provides a method for installing a trash can, which includes the following steps: providing a spliced trash can, comprising: a bucket wall with an upper end and a lower end comprising a plurality of wall plates, wherein clamping components are arranged on the wall plates, and the plurality of wall plates are sequentially connected through the clamping components to form the bucket wall;

an upper cover attached to the upper end of the bucket wall;

a lower seat attached to the lower end of the bucket wall;

a plurality of reinforcing plates attached to the wall plate; and wherein, the wall plate comprises a clamping end and a receiving end, the clamping end is arranged in a direction extending between the upper end and the lower end, and the receiving end corresponds to the clamping end; the clamping component comprises at least one clamping part arranged at the clamping end and at least one receiving bayonet arranged at the receiving end, the receiving bayonet corresponds to the clamping part, and the wall plates are detachably connected through the clamping part and the receiving bayonet;

sequentially clamping the clamping part of the wall plate and the receiving bayonet of an adjacent wall plate to assemble the bucket wall; and attaching the upper cover above the bucket wall; and attaching the lower seat below the bucket wall.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

In the figures.

Bucket wall (1000); Upper end (1001); Lower end (1002); Locking rib (1003); Locking groove (1004); Fixing hole (1005); Handle part (1006); Upper connecting part (1010); First buckling hole (1011); Lower connecting part (1020); Second buckling hole (1021); Clamping component (1100); Clamping end (1101); Receiving end (1102); Clamping part (1110); Clamping block (1111); First clamping protrusion (1112); Second clamping protrusion (1113); Positioning block (1114); Guide slope (1115); Receiving bayonet (1120); Passing part (1121); First receiving part (1122); Second receiving part (1123); Wall plate (1200); Upper cover (2000); Inlet (2001); Cover (2002); Rotating member (2003); Sensing module (2004); Power supply (2005); Connecting groove (2006); First buckling protrusion (2007); Lower seat (3000); Accommodating groove (3001); Second buckling protrusion (3002); Reinforcing plate (4000); Fixing protrusion (4001); Through hole (4002).

DESCRIPTION OF EMBODIMENTS

In the following, the technical solution in the embodiment of the application will be clearly and completely described with reference to the drawings in the embodiment of the application. Obviously, the described embodiment is only a part of the embodiment of the application, but not the whole embodiment. Based on the embodiments in this application, all other embodiments obtained by those skilled in the art without creative labor belong to the protection scope of this application.

Reference to "an example" or "an embodiment" herein means that a particular feature, structure or characteristic described in connection with an embodiment or an embodiment can be included in at least one embodiment of this application. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

In this specification, for the sake of convenience, words and expressions indicating orientation or positional relationship such as "middle", "upper", "lower", "front", "rear", "vertical", "horizontal", "top", "inner" and "outer" are used to illustrate the positional relationship of constituent elements with reference to the attached drawings, only for the convenience of description. The positional relationship of the constituent elements is appropriately changed according to the direction of the described constituent elements. Therefore, it is not limited to the words and expressions described in the specification, and can be replaced appropriately according to the situation.

Figure 1:
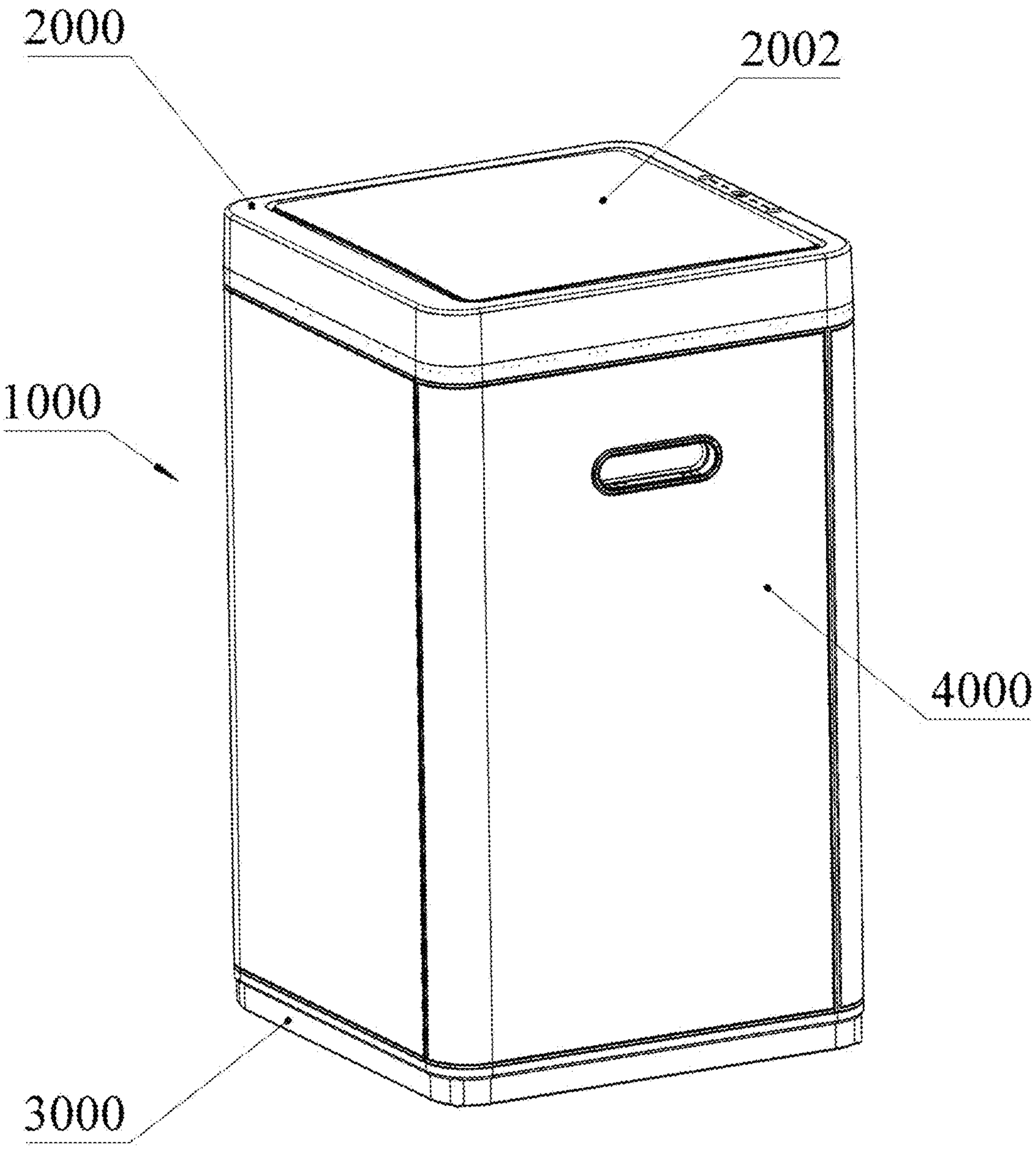
FIG. 1 is a schematic diagram of a spliced trash can.
Figure 2:
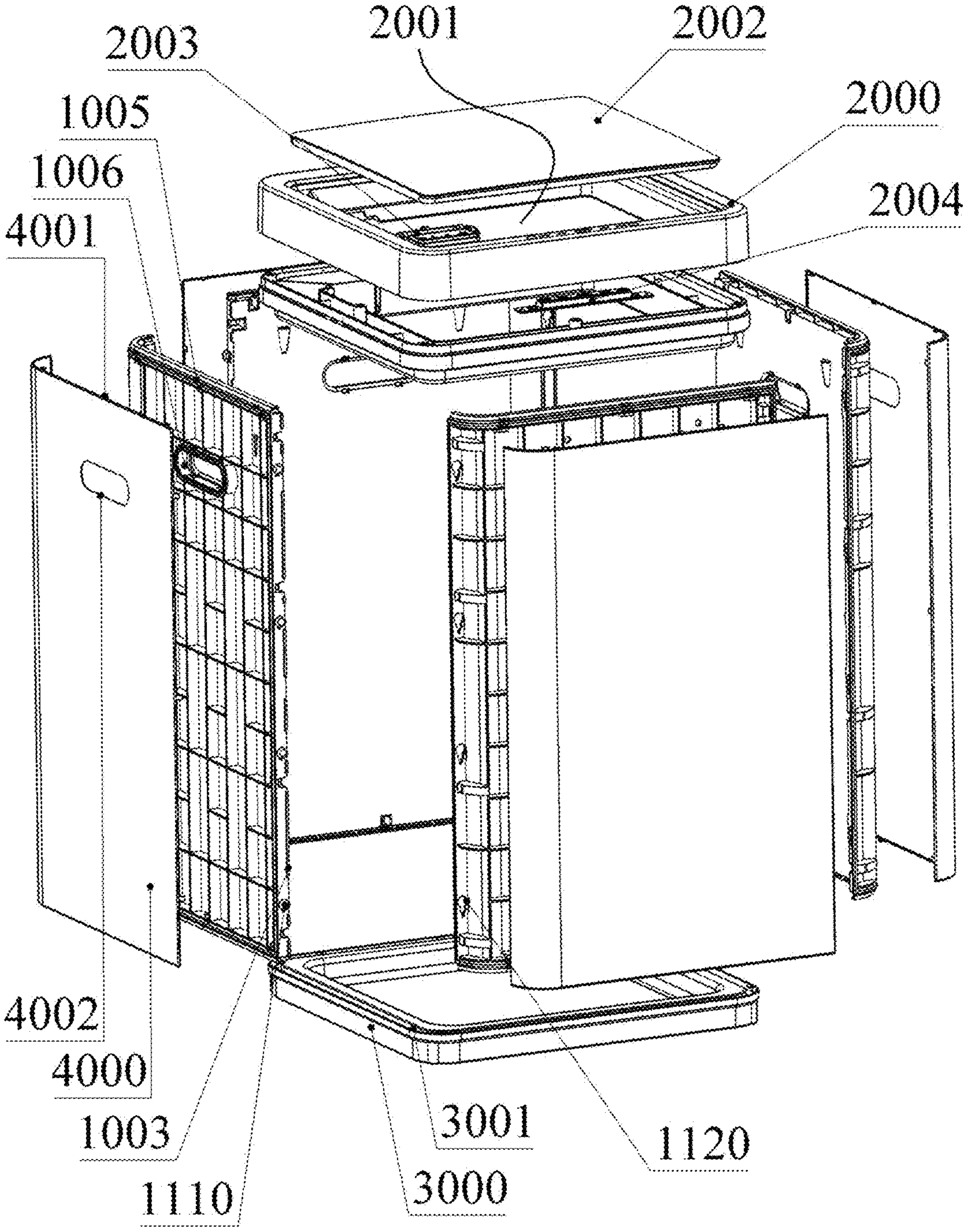
FIG. 2 is an explosion diagram of FIG. 1.

As shown in FIGS. 1 to 2, the present invention provides a spliced trash can, which includes a bucket wall 1000 with an upper end 1001 and a lower end 1002, including a plurality of wall plates 1200, wherein a clamping component 1100 is arranged on the wall plate 1200, and the plurality of wall plates 1200 are sequentially connected through the clamping component 1100 to form the bucket wall 1000;

an upper cover 2000 attached to the upper end 1001 of the bucket wall 1000;

a lower seat 3000 attached to the lower end 1002 of the bucket wall 1000;

a plurality of reinforcing plates 4000 attached to the wall plate 1200;

wherein, the wall plate 1200 comprises a clamping end 1101 and a receiving end 1102, wherein the clamping end 1101 is arranged in the direction extending between the upper end 1001 and the lower end 1002, and the receiving end 1102 corresponds to the clamping end 1101; and the clamping component 1100 comprises at least one clamping part 1110 arranged at the clamping end 1101 and at least one receiving bayonet 1120 arranged at the receiving end 1102, and the receiving bayonet 1120 corresponds to the clamping part 1110, and the wall plates 1200 are detachably connected through the clamping part 1110 and the receiving bayonet 1120.

In this embodiment, the spliced trash can is composed of a plurality of wall plates, which are connected through the clamping components, so that the size and shape of the trash can may be adjusted as required, and the use flexibility is increased. Because the panels are detachably connected, when a panel is dirty or damaged, it can be cleaned or replaced separately, without replacing the whole trash can, thus reducing the maintenance cost. When assembling, each wall plate can be stored separately, which occupies small space and is convenient for transportation and storage. When it needs to be used, it can be assembled again. Through the arrangement of the reinforcing plates, the structural strength of the trash can may be effectively increased, so that it can bear greater weight and more complicated use environment. The modular design of the spliced trash can is conducive to the reuse and recovery of resources, which conforms to the concept of environmental protection.

As shown in FIG. 2, in this embodiment, the wall plate 1200 is arranged in a rectangular shape. In other embodiments (not shown in the figure), the wall plate is not limited to being rectangular, but also can be circular, oval or other irregular wall plates to meet the needs of different occasions. At the same time, we can also design panels with different sizes to meet the needs of different capacities. In addition to common plastic materials, metal, wood or other environmentally friendly materials can also be used to make siding to meet different use environments and aesthetic needs.

In some embodiments (not shown in the figure), a partition board or a partition bag is arranged inside the bucket wall to divide the trash can into a plurality of areas for storing different types of garbage in a classified manner. This is helpful to improve the efficiency and accuracy of garbage classification. Decorative patterns, colors, textures and other elements are added to the bucket wall or the upper cover, so that the trash can not only has practical functions, but also can become a part of indoor or outdoor environment, and enhance the overall aesthetic feeling. Moreover, it is set as a plurality of trash can modules that can be connected with each other, and users can freely combine and expand the capacity and shape of trash cans as needed. This design is suitable for large-scale activities or temporary storage of a large amount of garbage.

Figure 3:
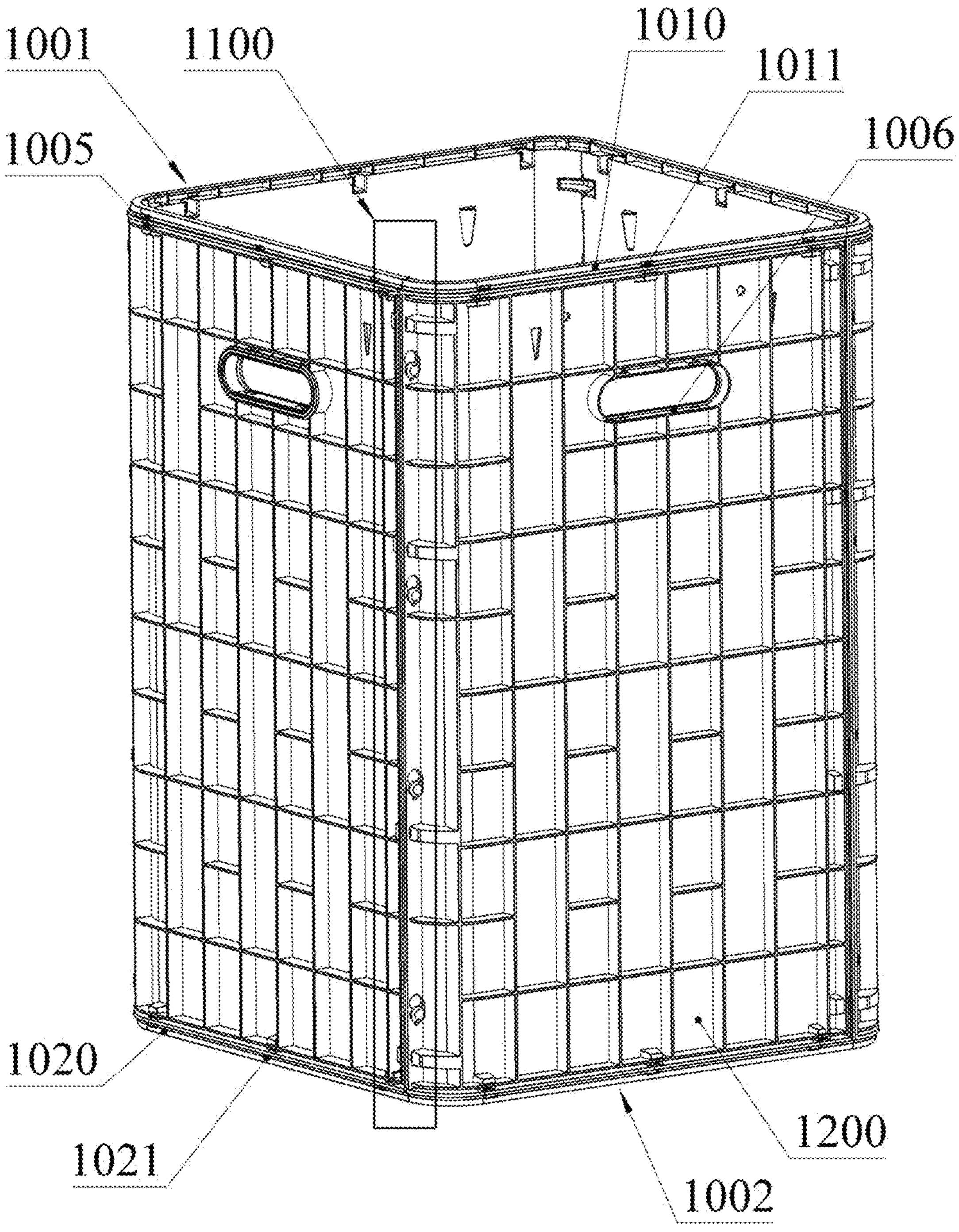
FIG. 3 is a schematic view of the bucket wall.
Figure 4:
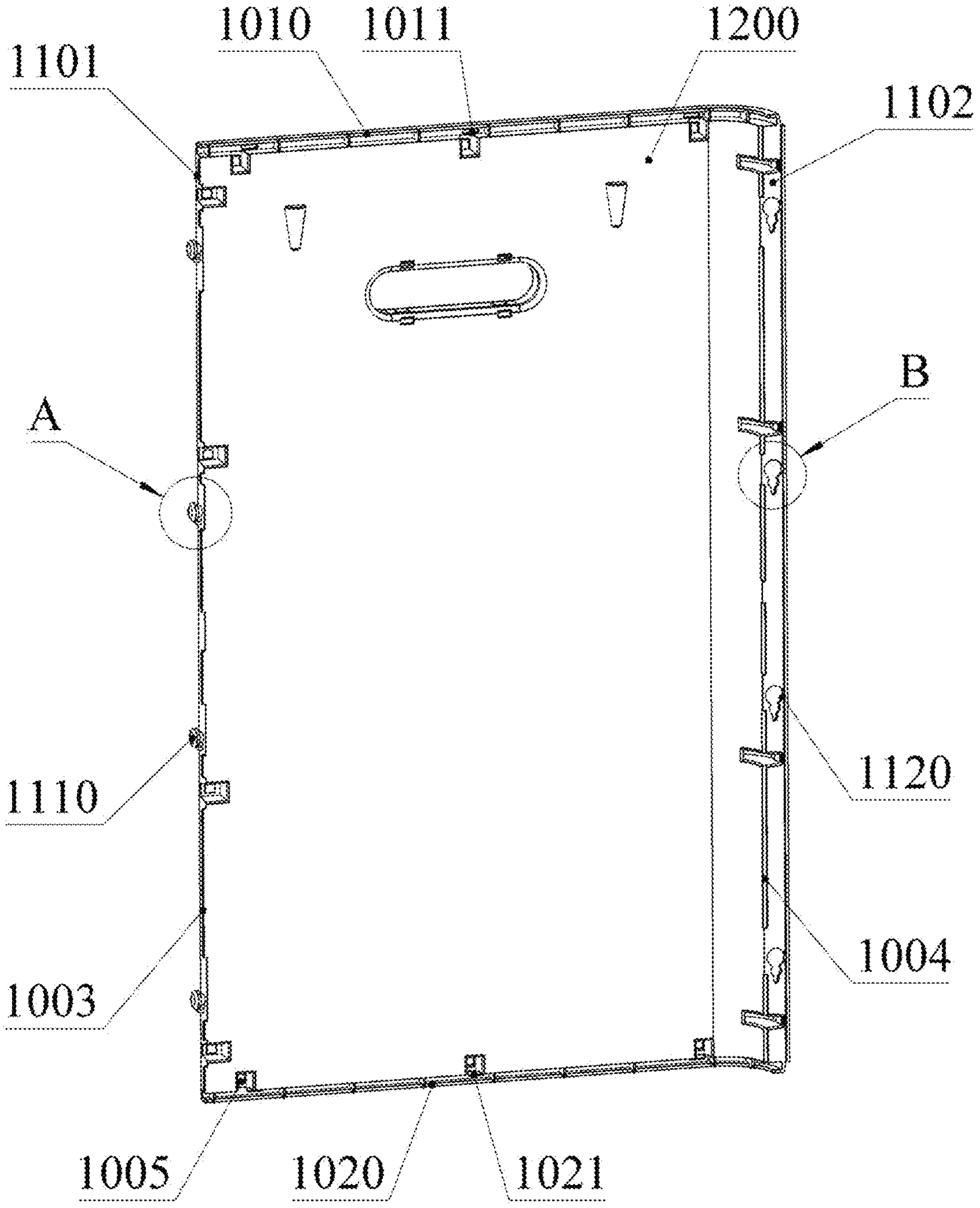
FIG. 4 is a schematic view of a wall panel.
Figure 5:
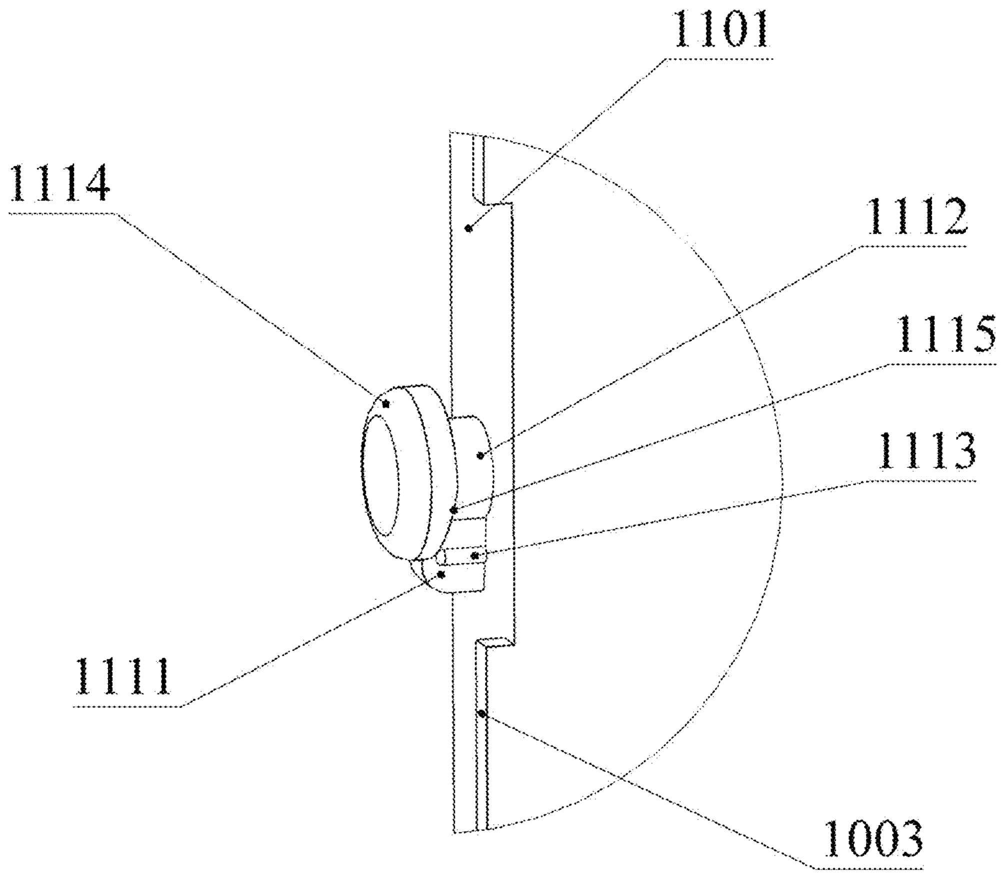
FIG. 5 is a schematic view of the clamping part.
Figure 6:
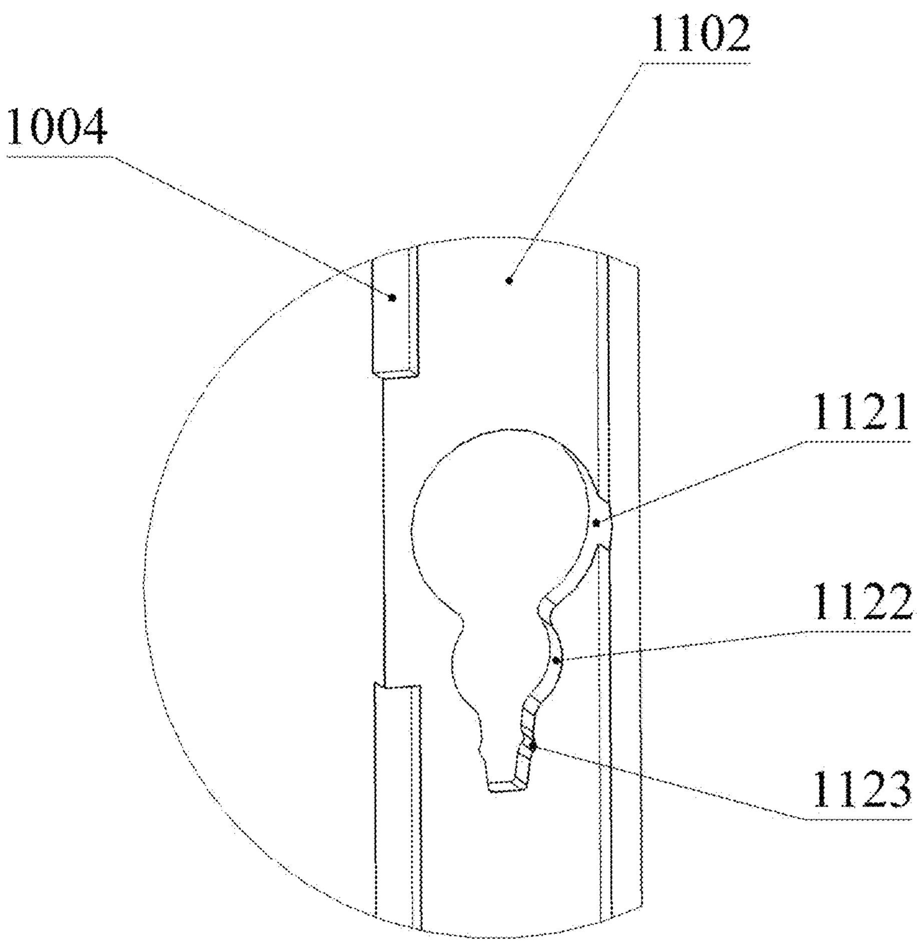
FIG. 6 is a schematic view of the receiving bayonet.

As shown in FIGS. 3 to 5, in this embodiment, the clamping part 1110 includes a clamping block 1111 protruding from the clamping end 1101, a first clamping protrusion 1112 and a second clamping protrusion 1113 being formed on the clamping block 1111, and a positioning block 1114 formed on the first clamping protrusion 1112, wherein guide slope 1115 is formed at one end of the positioning block 1114 near the clamping end 1101.

In this embodiment, the clamping end is arranged in the direction extending between the upper end and the lower end, so that the wall plate can be stably connected in the vertical direction. Specifically, the clamping end of each wall plate is provided with a clamping block which protrudes outward from one side of the wall plate. On the clamping block, two main parts are designed: the first clamping protrusion and the second clamping protrusion. The two clamping protrusions are located at two sides of the clamping block respectively, and are used for cooperating with the receiving bayonet on the receiving end to form a stable connection.

In addition, in order to enhance the stability of the connection and facilitate the assembly, a positioning block is further provided on the first clamping protrusion. This locating block not only provides guidance during assembly, but also increases the firmness of connection. In particular, a guide slope is designed at one end of the positioning block near the clamping end. This guide slope makes it easier for the positioning block to enter the corresponding position of the receiving end during assembly, thus simplifying the assembly process.

As shown in FIGS. 3 to 6, in this embodiment, the receiving end 1102 corresponds to the clamping end 1101, and a receiving bayonet 1120 is formed at the receiving end 1102. The receiving bayonet 1120 includes a passing part 1121, a first receiving part 1122 and a second receiving part 1123 in turn. The passing part 1121 is configured to have a shape capable of passing through the positioning block 1114 and the clamping block 1111, and the first receiving part 1122 is configured to have a shape of receiving the first clamping protrusion 1112, and the second receiving part 1123 is configured to have a shape of receiving the second clamping protrusion 1113.

In this embodiment, the receiving end corresponds to the clamping end, and the receiving end is provided with a receiving bayonet. Specifically, the receiving bayonet is designed to include three main parts: a passing part, a first receiving part and a second receiving part. Each part is customized for the specific components on the clamping end.

Specifically, the passing part is designed in a shape that allows the positioning block and the clamping block to pass smoothly. The space design of this part is just right, and it will not be too loose to cause inaccurate positioning, nor too compact to make assembly difficult. The assembly process is smoother through the existence of the part, and at the same time, the positioning block can be ensured to enter its predetermined position accurately.

Specifically, the first receiving part is specially designed to have a shape of receiving and fixing the first clamping projection. This tight fit not only ensures the stability of the connection, but also prevents the relative movement between the panels. The shape and size of the first receiving part are matched with the first clamping protrusion, thus ensuring the perfect fit between them.

Specifically, similar to the first receiving part, the second receiving part is also customized to have a shape of receiving and fixing the second clamping projection. This design further enhances the stability and reliability of the connection. The close cooperation between the second receiving part and the second clamping protrusion ensures that the trash can has excellent bearing capacity in many directions.

As shown in FIG. 4, in this embodiment, the clamping end 1101 is provided with at least one locking rib 1003, and the receiving end 1102 is provided with an locking groove 1004 corresponding to the locking rib 1003.

In order to further improve the assembly accuracy and stability of the spliced trash can, the design is further optimized. Specifically, at least one locking rib is arranged at the clamping end, and a locking groove matching the locking rib is arranged at the receiving end.

The locking rib is usually designed as a protruding structure, and its shape and size are accurately calculated to ensure that it can be accurately and stably embedded into the locking groove at the receiving end. The locking groove is a concave structure, and its shape and size are matched with the locking rib, so that the locking rib can be inserted and fixed in the locking groove smoothly.

The advantage of this design is that through the precise cooperation of the locking rib and the locking groove, it can be ensured that all parts of the spliced trash cancan be aligned and fixed accurately during assembly. This not only improves the efficiency of assembly, but also enhances the overall stability and bearing capacity of the trash can.

As shown in FIG. 2, in this embodiment, the upper cover 2000 includes an inlet 2001 and a cover 2002, which is rotatably connected to one end of the inlet 2001; and a rotating member 2003 is arranged between the cover 2002 and the upper cover 2000, the rotating member 2003 is fixedly connected with the cover 2002, and the cover 2002 is rotatably connected with the upper cover 2000.

In this embodiment, the upper cover part includes an inlet and a cover, and the cover is rotatably connected with the inlet through a specially designed rotating member. Specifically, the cover is designed to be wide enough to completely cover the inlet, so as to ensure that the trash can is able to effectively prevent odor diffusion and garbage scattering in the closed state. One end of the cover is connected with the inlet edge of the upper cover through a rotating member. This rotating member is carefully designed to ensure the stability and smoothness of the closure during rotation.

Wherein, the rotating member is fixedly connected with the sealing cover, so as to ensure that the two parts can keep synchronous movement during the rotating process. At the same time, the rotary connection between the cover and the upper cover is realized through the rotating member, which means that the user can open or close the cover through simple rotary action without using additional tools or complicated operations.

Figure 7:
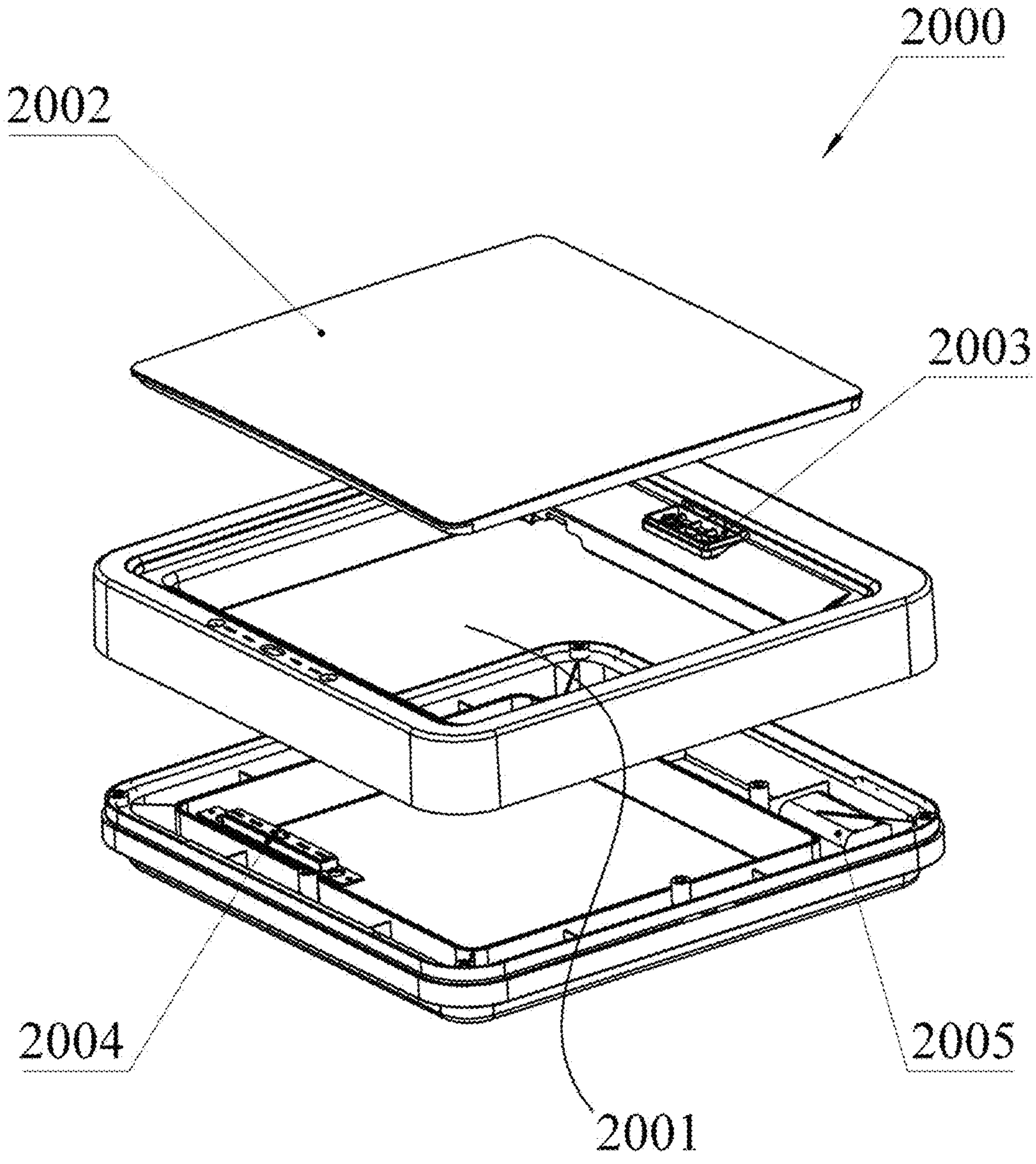
FIG. 7 is an exploded view of the upper cover.

As shown in FIGS. 2 and 7, in this embodiment, the upper cover 2000 is further provided with a sensing module 2004 and a power supply 2005. The sensing module 2004 is electrically connected with the rotating member 2003 and the power supply 2005, and when the sensing module 2004 senses that an external object is approaching, the rotating member 2003 is driven to rotate the cover 2002 to open the inlet 2001.

The sensing module is electrically connected with the rotating member and the power supply, thus realizing the intelligent automatic opening function.

Specifically, the sensing module is installed in a suitable position on the upper cover, which can ensure that it can accurately sense the approach of external objects. When the sensing module detects that someone or an object approaches the inlet of the trash can, it will immediately send a signal to the power supply, and then drive the rotating member to rotate. The rotation of the rotating member will drive the movement of the cover and make it open automatically, thus exposing the inlet of the trash can.

This design greatly improves the user experience. Users do not need to open the cover manually, just put the garbage near the inlet of the trash can, and the sensing module will automatically sense and drive the cover to open. This is not only convenient and fast, but also reduces the direct contact between the user and the trash can, which is conducive to maintaining cleanliness and hygiene.

Figure 8:
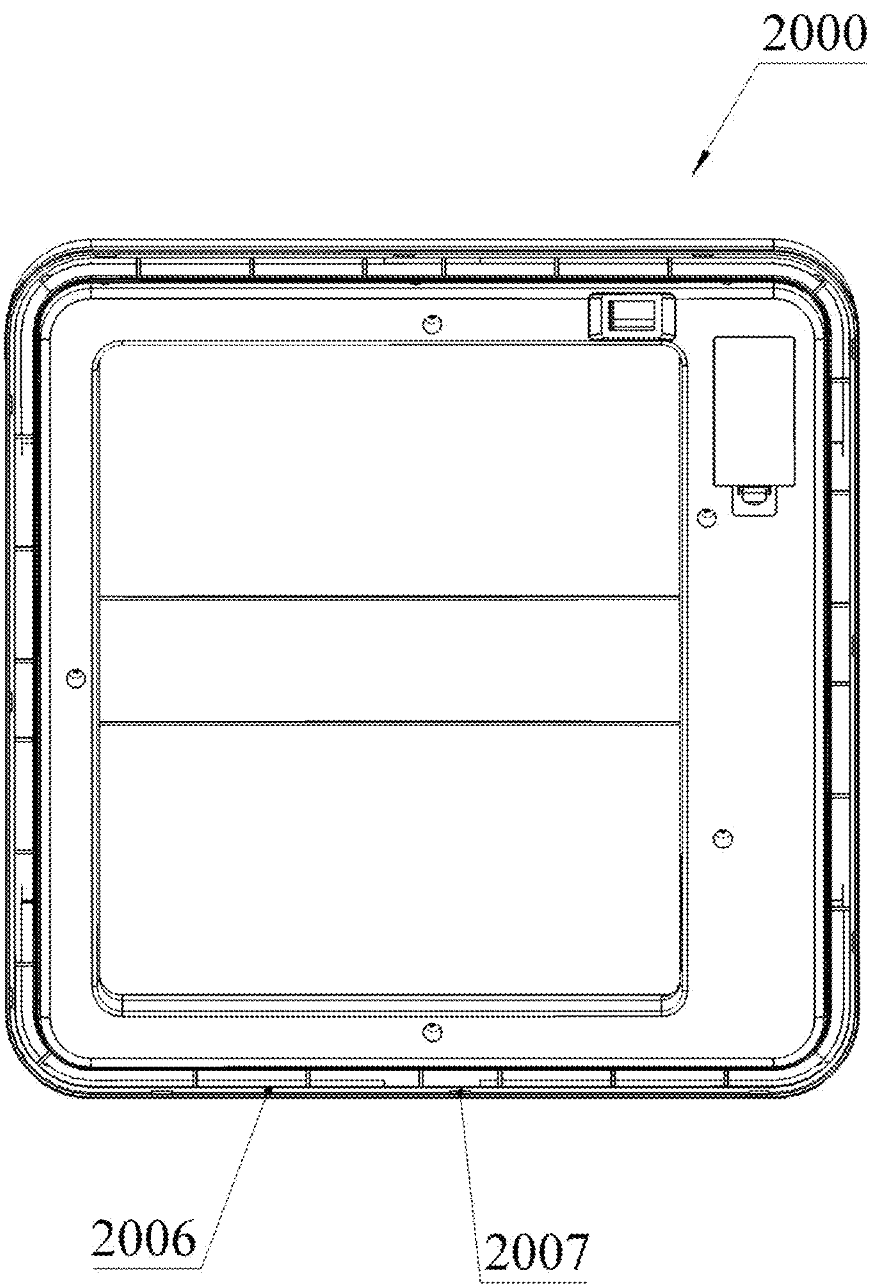
FIG. 8 is a schematic view of the upper cover.

As shown in FIGS. 4 and 8, in this embodiment, a connecting groove 2006 for accommodating at least part of the bucket wall 1000 is provided below the upper cover 2000; at least one first buckling protrusion 2007 is provided in the connecting groove 2006, and at least one first buckling hole 1011 corresponding to the first buckling protrusion 2007 is provided at the upper end 1001 of the wall plate 1200, wherein the upper cover 2000 and the bucket wall 1000 are detachably connected through the first buckling protrusion 2007 and the first buckling hole 1011.

Specifically, at an appropriate position of the connecting groove, at least one first buckling protrusion is arranged. These protrusions are carefully designed and positioned to ensure that they can accurately correspond to the first buckling holes on the upper end of the wall plate. The first buckling hole is pre-opened at the upper end of the wall plate, and its size and shape are matched with the first buckling protrusion to ensure the smooth engagement of the two.

When the upper cover needs to be assembled with the bucket wall, the user only needs to align the upper cover with the bucket wall and gently press it down. In this process, the first buckling protrusion will naturally be inserted into the corresponding first buckling hole to form a firm connection. Similarly, when the upper cover needs to be disassembled, the user only needs to gently lift the upper cover, and the first buckling protrusion will come out of the buckling hole, thus realizing rapid disassembly.

As shown in FIG. 3, in this embodiment, an upper end 1001 of the wall plate 1200 is provided with an upper connecting part 1010, which is configured to enter the connecting groove 2006, and a first buckling hole 1011 is provided in the upper connecting part 1010.

In order to further optimize the structural design and assembly convenience of the spliced trash can, an upper connecting part is provided at the upper end of the wall plate and configured to enter the connecting groove. At the same time, the first buckling hole is arranged in the upper connecting part to ensure accurate and firm detachable connection with the first buckling protrusion in the connecting groove.

The upper connecting part is usually designed as a protruding structure matching with the connecting groove, and its size and shape are carefully calculated to ensure that it can smoothly enter the connecting groove and closely cooperate with it. At the same time, the upper connecting part also considers the requirements of the buckling mechanism, and sets the first buckling hole in its proper position to match the first buckling protrusion in the connecting groove.

The advantage of this design is that the introduction of the upper joint makes the connection between the wall plate and the upper cover smoother and more stable. Through the close cooperation between the upper connecting part and the connecting groove, and the buckling connection between the first buckling hole and the first buckling protrusion, all parts of the trash can be firmly assembled together to form a stable and complete whole.

Figure 9:
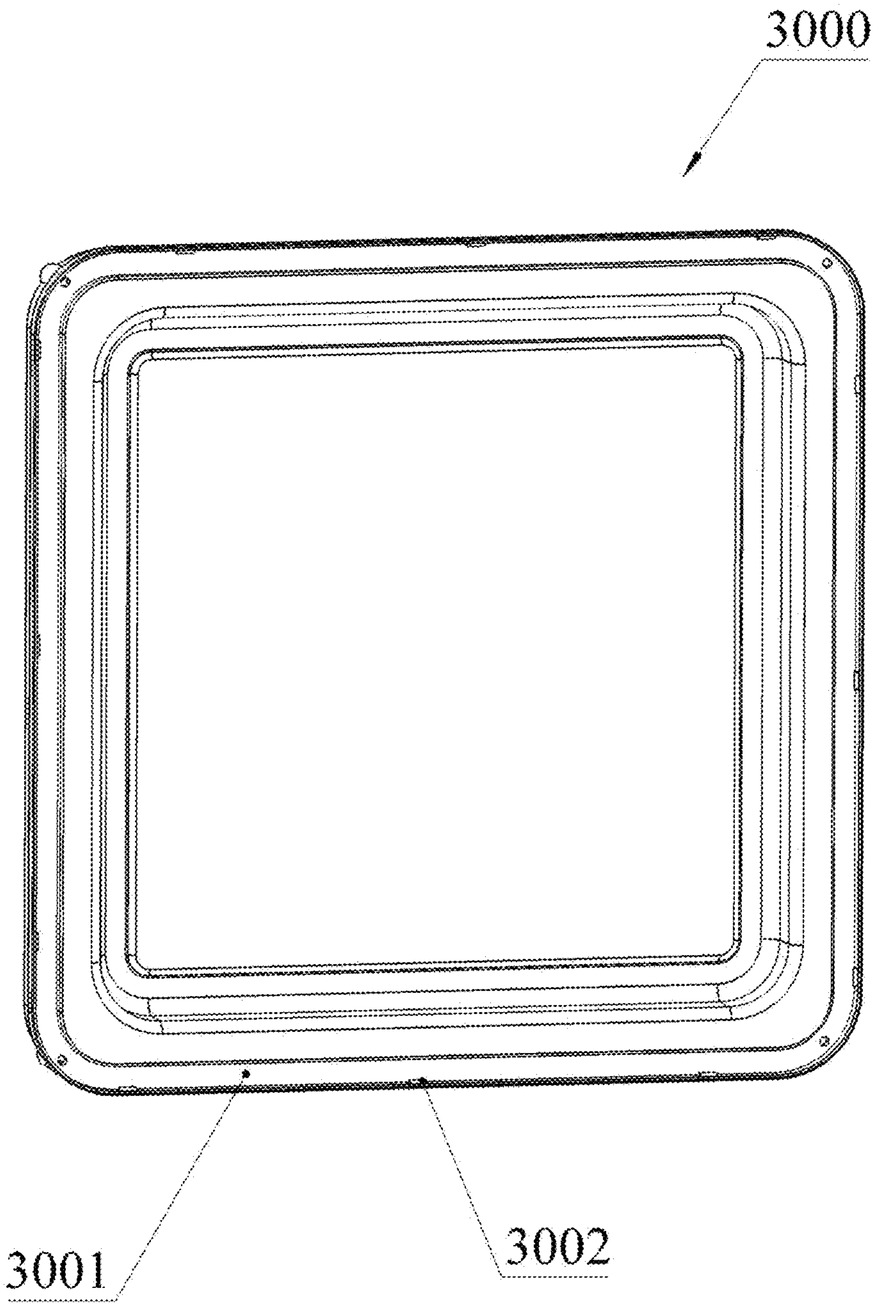
FIG. 9 is a schematic view of the lower seat.

As shown in FIG. 4 and FIG. 9, in this embodiment, an accommodating groove 3001 for accommodating at least part of the bucket wall 1000 is arranged above the lower seat 3000, at least one second buckling protrusion 3002 is arranged in the accommodating groove 3001, and at least one second buckling hole 1021 corresponding to the second buckling protrusion 3002 is arranged at the upper end 1001 of the wall plate 1200, wherein lower seat 3000 and the bucket wall 1000 are detachably connected through the second buckling protrusion 3002 and the second buckling hole 1021.

In order to further improve the assembly efficiency and structural stability of the spliced trash can, an accommodating groove is provided above the lower seat to accommodate and fix part of the bucket wall. At least one second buckling protrusion is arranged in the accommodating groove; at the same time, at the lower end of the wall plate, at least one second buckling hole corresponding to the second buckling protrusion is also provided. Through this design, a detachable connection is formed between the lower seat and the bucket wall.

Specifically, the size and shape of the accommodating groove are carefully designed to ensure that it can closely fit and accommodate part of the bucket wall. The advantage of this is that it not only increases the overall stability of the trash can, but also prevents the bucket wall from shaking or shifting during use.

At an appropriate position of the accommodating groove, at least one second buckling protrusion is arranged. These protrusions are usually made of elastic materials, which have certain flexibility and resilience. When the lower end of the wall plate is in contact with the accommodating groove, the second buckling protrusion will automatically extend into the corresponding second buckling hole to form a firm buckling connection.

The advantage of this design is that the user only needs to align the lower end of the wall plate with the receiving groove and gently press it down to complete the assembly. Similarly, when disassembly is needed, the user only needs to gently lift the wall plate, and the second buckling protrusion will automatically come out of the buckling hole, thus realizing rapid disassembly.

As shown in FIG. 3, in this embodiment, the lower end 1002 of the wall plate 1200 is provided with a lower connecting part 1020, which is configured to enter the accommodating groove 3001, and a second buckling hole 1021 is provided in the lower connecting part 1020.

In order to further improve the assembly convenience and structural stability of the spliced trash can, a lower connecting part is designed at the lower end of the wall plate and configured to enter the receiving groove. At the same time, a second buckling hole is arranged in the lower connecting part to ensure accurate and firm detachable connection with the second buckling protrusion in the accommodating groove.

The lower connecting part is a special design of the bottom of the wallboard, and its shape and size are matched with the receiving groove to ensure that it can smoothly enter and closely fit in the receiving groove. The second buckling holes are provided at the proper position of the lower connecting part, and these holes correspond to the second buckling protrusions in the accommodating groove, so as to realize stable fastening connection.

As shown in FIG. 2, in this embodiment, the reinforcing plate 4000 is provided with a plurality of fixing protrusions 4001, and the wall plate 1200 is provided with a plurality of fixing holes 1005 corresponding to the fixing protrusions 4001, and the reinforcing plates 4000 and the wall plates 1200 are detachably connected through the fixing protrusions 4001 and the fixing holes 1005.

Specifically, the reinforcing plate is provided with a plurality of fixing protrusions, while the wall plate is correspondingly provided with a plurality of fixing holes.

Through these fixing protrusions and holes, a firm and detachable connection is formed between the reinforcement plate and the wall plate.

The fixing protrusion is usually designed to have a certain elastic structure to ensure that it can be inserted into the fixing hole smoothly in the assembly process. These protrusions can be made of rubber, plastic or other elastic materials to provide sufficient elasticity and resilience. When the reinforcing plate is aligned and close to the wall plate, the fixing protrusions will automatically extend into the corresponding fixing holes to form a tight connection.

The advantage of this design is that it allows users to easily assemble and disassemble the reinforcing plate and the wall plate. In the assembly process, the user only needs to align the reinforcing plate with the fixing hole on the wall plate and press it down gently, and the fixing protrusion will automatically extend into the hole to complete the connection. Similarly, when disassembly is needed, the user only needs to gently lift the reinforcing plate, and the fixing protrusion will come out of the fixing hole, thus realizing rapid disassembly.

As shown in FIG. 2, in this embodiment, the wall plate 1200 is provided with a handle part 1006, and the reinforcing plate 4000 is provided with a through hole 4002 corresponding to the handle part 1006.

When further improving the practicability and convenience of the spliced trash can, the auxiliary facilities that users may need during use are considered. Therefore, the handle part is added to the wall plate, and at the same time, the reinforcing plate is correspondingly provided with a through hole, so that the handle part can pass through the through hole and provide better support and stability for users.

The design of the handrail fully considers the ergonomic principle, and its shape, size and position have been carefully calculated and adjusted to ensure that users can hold it comfortably and naturally. Handrails are usually made of strong and easy-to-clean materials to ensure their durability and hygiene.

The through hole on the reinforcing plate is matched with the handle part, so that the handle part can smoothly pass through the through hole and form a whole with the reinforcing plate. This design not only enhances the overall structural stability of the trash can, but also makes the handrail more firm and reliable.

The present invention also provides a method for installing a trash can, which comprises the following steps: providing a spliced trash can, comprising: a bucket wall with an upper end and a lower end comprising a plurality of wall plates, wherein clamping components are arranged on the wall plates, and the plurality of wall plates are sequentially connected through the clamping components to form the bucket wall;

an upper cover attached to the upper end of the bucket wall;

a lower seat attached to the lower end of the bucket wall;

a plurality of reinforcing plates attached to the wall plate; and wherein, the wall plate comprises a clamping end and a receiving end, the clamping end is arranged in a direction extending between the upper end and the lower end, and the receiving end corresponds to the clamping end; the clamping component comprises at least one clamping part arranged at the clamping end and at least one receiving bayonet arranged at the receiving end, the receiving bayonet corresponds to the clamping part, and the wall plates are detachably connected through the clamping part and the receiving bayonet;

sequentially clamping the clamping part of the wall plate and the receiving bayonet of an adjacent wall plate to assemble the bucket wall; and attaching the upper cover above the bucket wall; and attaching the lower seat below the bucket wall.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A spliced trash can, comprising:

a bucket wall with an upper end and a lower end, wherein the bucket wall comprises a plurality of wall plates, clamping components are arranged on the wall plates, and the plurality of wall plates are sequentially connected through the clamping components to form the bucket wall;

an upper cover attached to the upper end of the bucket wall;

a lower seat attached to the lower end of the bucket wall;

wherein, each of the wall plates comprises a clamping end and a receiving end, the clamping end is arranged in a direction extending between the upper end and the lower end, and the receiving end corresponds to the clamping end of an adjacent wall plate; and each of the clamping components comprises at least one clamping part arranged at the clamping end and at least one receiving bayonet arranged at the receiving end, the receiving bayonet corresponds to the clamping part of the adjacent wall plate, and the wall plates are detachably connected through the clamping parts and the receiving bayonets, wherein the clamping part of each of the clamping components comprises a clamping block protruding at the clamping end, a first clamping protrusion and a second clamping protrusion being formed on the clamping block, and a positioning block formed on the first clamping protrusion, wherein a guide slope is formed at one end of the positioning block near the clamping end.

2. The spliced trash can according to claim 1, the receiving bayonet sequentially comprises a passing part, a first receiving part and a second receiving part, wherein the passing part is configured to have a shape capable of passing through the positioning block and the clamping block, the first receiving part is configured to have a shape of receiving the first clamping protrusion, and the second receiving part is configured to have a shape of the second clamping protrusion.

3. The spliced trash can according to claim 2, wherein the upper cover comprises an inlet and a cover, the cover is rotatably connected to one end of the inlet; and a rotating member is arranged between the cover and the upper cover, the rotating member is fixedly connected with the cover, and the cover is rotatably connected with the upper cover.

4. The spliced trash can according to claim 3, wherein the upper cover is further provided with a sensing module and a power supply, the sensing module is electrically connected with the rotating member and the power supply, and when the sensing module senses that an external object is approaching, the rotating member is driven to rotate the cover to open the inlet.

5. The spliced trash can according to claim 4, wherein a connecting groove for accommodating at least part of the bucket wall is arranged below the upper cover, at least one first buckling protrusion is arranged in the connecting groove, and at least one first buckling hole corresponding to the first buckling protrusion is arranged at the upper end of the bucket wall, wherein the upper cover and the bucket wall are detachably connected through the first buckling protrusion and the first buckling hole.

6. The spliced trash can according to claim 5, wherein an accommodating groove for accommodating at least part of the bucket wall is arranged above the lower seat, at least one second buckling protrusion is arranged in the accommodating groove, and at least one second buckling hole corresponding to the second buckling protrusion is arranged at the lower end of the bucket wall, wherein the lower seat and the bucket wall are detachably connected through the second buckling protrusion and the second buckling hole.

7. A spliced trash can, comprising:

a bucket wall with an upper end and a lower end comprising a plurality of wall plates, wherein clamping components are arranged on the wall plates, and the plurality of wall plates are sequentially connected through the clamping components to form the bucket wall;

an upper cover attached to the upper end of the bucket wall;

a lower seat attached to the lower end of the bucket wall;

a plurality of reinforcing plates attached to the wall plate;

wherein, each of the wall plates comprises a clamping end and a receiving end, the clamping end is arranged in a direction extending between the upper end and the lower end, and the receiving end corresponds to the clamping end of an adjacent wall plate; and each of the clamping components comprises at least one clamping part arranged at the clamping end and at least one receiving bayonet arranged at the receiving end, the receiving bayonet corresponds to the clamping part of the adjacent wall plate, and the wall plates are detachably connected through the clamping parts and the receiving bayonets, wherein the clamping part of each of the clamping components comprises a clamping block protruding at the clamping end, a first clamping protrusion and a second clamping protrusion being formed on the clamping block, and a positioning block formed on the first clamping protrusion, wherein a guide slope is formed at one end of the positioning block near the clamping end.

8. The spliced trash can according to claim 7, wherein the receiving bayonet sequentially comprises a passing part, a first receiving part and a second receiving part, wherein the passing part is configured to have a shape capable of passing through the positioning block and the clamping block, the first receiving part is configured to have a shape of receiving the first clamping protrusion, and the second receiving part is configured to have a shape of the second clamping protrusion.

9. The spliced trash can according to claim 8, wherein the upper cover comprises an inlet and a cover, and the cover is rotatably connected to one end of the inlet; and a rotating member is arranged between the cover and the upper cover, the rotating member is fixedly connected with the cover, and the cover is rotatably connected with the upper cover.

10. The spliced trash can according to claim 9, wherein the upper cover is further provided with a sensing module and a power supply, the sensing module is electrically connected with the rotating member and the power supply, and when the sensing module senses that an external object is approaching, the rotating member is driven to rotate the cover to open the inlet.

11. The spliced trash can according to claim 10, wherein a connecting groove for accommodating at least part of the bucket wall is arranged below the upper cover, at least one first buckling protrusion is arranged in the connecting groove, and at least one first buckling hole corresponding to the first buckling protrusion is arranged at the upper end of the bucket wall, wherein the upper cover and the bucket wall are detachably connected through the first buckling protrusion and the first buckling hole.

12. The spliced trash can according to claim 11, wherein an accommodating groove for accommodating at least part of the bucket wall is arranged above the lower seat, at least one second buckling protrusion is arranged in the accommodating groove, and at least one second buckling hole corresponding to the second buckling protrusion is arranged at the lower end of the bucket wall, wherein the lower seat and the bucket wall are detachably connected through the second buckling protrusion and the second buckling hole.

13. The spliced trash can according to claim 12, wherein a plurality of fixing protrusions are arranged on the reinforcing plates, and a plurality of fixing holes corresponding to the fixing protrusions are arranged on the wall plates, and the reinforcing plates and the wall plates are detachably connected through the fixing protrusions and the fixing holes.

14. The spliced trash can according to claim 13, wherein the wall plates are provided with handle parts, and the reinforcing plates are provided with through holes corresponding to the handle parts.

15. The spliced trash can according to claim 8, wherein at least one locking rib is arranged at the clamping end, and a locking groove corresponding to the locking rib of the adjacent wall plate is arranged at the receiving end.

16. The spliced trash can according to claim 11, wherein an upper connecting part is arranged at the upper end of the bucket wall, the upper connecting part is configured to be capable of entering the connecting groove, and the first buckling hole is arranged in the upper connecting part.

17. The spliced trash can according to claim 12, wherein a lower connecting part is arranged at the lower end of the bucket wall, and the lower connecting part is configured to be capable of the accommodating groove, and the second buckling hole is arranged in the lower connecting part.

18. A method for installing a trash can, comprising the following steps: providing a spliced trash can, comprising: a bucket wall with an upper end and a lower end, comprising a plurality of wall plates, wherein clamping components are arranged on the wall plates, and the plurality of wall plates are sequentially connected through the clamping components to form the bucket wall;

an upper cover attached to the upper end of the bucket wall;

a lower seat attached to the lower end of the bucket wall;

a plurality of reinforcing plates attached to the wall plate;

wherein, each wall plate comprises a clamping end and a receiving end, the clamping end is arranged in a direction extending between the upper end and the lower end, and the receiving end corresponds to the clamping end of an adjacent wall plate;

each of the clamping components comprises at least one clamping part arranged at the clamping end and at least one receiving bayonet arranged at the receiving end, the receiving bayonet corresponds to the clamping part of the adjacent wall plate, and the wall plates are detachably connected through the clamping parts and the receiving bayonets, wherein the clamping part of each of the clamping components comprises a clamping block protruding at the clamping end, a first clamping protrusion and a second clamping protrusion being formed on the clamping block, and a positioning block formed on the first clamping protrusion, wherein a guide slope is formed at one end of the positioning block near the clamping end;

sequentially clamping the clamping part of one wall plate and the receiving bayonet of the adjacent wall plate to assemble the bucket wall; and attaching the upper cover above the bucket wall; and attaching the lower seat below the bucket wall.

* * * * *